United States Patent
Lin et al.

(10) Patent No.: US 7,356,550 B1
(45) Date of Patent: Apr. 8, 2008

(54) METHOD FOR REAL TIME DATA REPLICATION

(75) Inventors: Chun-Ching Lin, Hsin-chu (TW); Shih-Yung Lo, Hsin-chu (TW)

(73) Assignee: Taiwan Semiconductor Manufacturing Company, Hsin-Chu (TW)

( * ) Notice: Subject to any disclaimer, the term of this patent is extended or adjusted under 35 U.S.C. 154(b) by 1145 days.

(21) Appl. No.: 09/888,166

(22) Filed: Jun. 25, 2001

(51) Int. Cl.
G06F 7/00 (2006.01)
G06F 17/30 (2006.01)
G06F 12/00 (2006.01)

(52) U.S. Cl. .................... 707/201; 707/8; 707/10

(58) Field of Classification Search .............. 707/8, 707/10, 201–203, 103 R, 103; 717/108, 717/131, 174; 713/100; 709/220, 246, 245
See application file for complete search history.

(56) References Cited

U.S. PATENT DOCUMENTS

| | | | |
|---|---|---|---|
| 5,603,024 A | 2/1997 | Goldring | 395/619 |
| 5,778,386 A | 7/1998 | Lin et al. | 707/200.1 |
| 5,781,910 A * | 7/1998 | Gostanian et al. | 707/201 |
| 5,806,075 A | 9/1998 | Jain et al. | 707/201 |
| 5,862,054 A | 1/1999 | Li | 364/468.28 |
| 5,884,328 A * | 3/1999 | Mosher, Jr. | 707/202 |
| 6,014,674 A * | 1/2000 | McCargar | 707/202 |
| 6,029,178 A * | 2/2000 | Martin et al. | 707/201 |
| 6,122,630 A * | 9/2000 | Strickler et al. | 707/8 |
| 6,192,365 B1 * | 2/2001 | Draper et al. | 707/101 |
| 6,247,128 B1 * | 6/2001 | Fisher et al. | 713/100 |
| 6,615,405 B1 * | 9/2003 | Goldman et al. | 717/174 |
| 6,711,575 B1 * | 3/2004 | Applewhite et al. | 707/100 |
| 6,795,868 B1 * | 9/2004 | Dingman et al. | 709/246 |

FOREIGN PATENT DOCUMENTS

TW 405084 1/2005

OTHER PUBLICATIONS

Doug Stacy (1995), Replication: DB2, Oracle, or Sysbase?, pp. 95-101.*

* cited by examiner

*Primary Examiner*—Wilson Lee
*Assistant Examiner*—Merilyn P Nguyen
(74) *Attorney, Agent, or Firm*—Haynes Boone, LLP

(57) ABSTRACT

A computer-based method of data replication of data in a programmable computer system having an ISAM database and a transaction log file, with the ISAM database having fields of tables and the transaction log file maintaining all files transactions of the ISAM database, comprising the following steps. Polling the transaction log file for file transactions of at least one selected ISAM database fields of tables by at least one data replication server. Reading the polled file transactions of the at least one selected ISAM database fields of tables by the at least one data replication server. Sending the polled file transactions of the at least one selected ISAM database fields of tables from the at least one data replication server to at least one relational database whereby the polled file transactions of the at least one selected ISAM database fields of tables sent to the at least one relational database is accessible in real time.

24 Claims, 5 Drawing Sheets

Transaction Log File

| Record # | Process ID | Flgs | File | Operation etc |
|---|---|---|---|---|
| 36319304 | 00000000 | | | Marker |
| 36319305 | 20C62255 | M | | Beg Mul Upd |
| 36319306 | 20C62255 | JM | FUTA | Delete FUTAKEY='TLK14831.1' |
| 36319307 | 20C62255 | JM | ACTL | Journal LOTID='K14831.1' |
| 36319308 | 20C62255 | JM | ACTL | Update LOTID='K14831.1' |
| 36319309 | 20C62255 | JM | ACTL | Journal LOTID='K14831.1' |
| 36319310 | 20C62255 | JM | ACTL | Update LOTID='K14831.1' |
| 36319311 | 20C62255 | | | End Mul Upd |
| 36319312 | 20C62255 | | ACTL | Update LOTID='K14721.1' |
| 36319313 | 20C61A54 | M | | Beg Mul Upd |
| 36319314 | 20C61A54 | JM | FUTA | Delete FUTAKEY='TLK14810.1' |
| 36319315 | 20C61A54 | JM | ACTL | Journal LOTID='K14810.1' |
| 36319316 | 20C61A54 | JM | ACTL | Update LOTID='K14810.1' |
| 36319317 | 20C61A54 | JM | ACTL | Journal LOTID='K14810.1' |
| 36319318 | 20C61A54 | JM | ACTL | Update LOTID='K14810.1' |
| 36319319 | 20C61A54 | | | End Mul Upd |
| 36319320 | 20C62255 | M | | Beg Mul Upd |
| 36319321 | 20C62255 | JM | EQPS | Putree EQPSKEY='ACOX01-AR...' |
| 36319322 | 20C62255 | JM | EQPS | Journal EQPSKEY='ACOX01-AC...' |

FIG. 2

| 200 Extraction Functions | 300 Work File Maintenance | 400 Join Functions | 500 External Interfaces | 600 Special Reports |
|---|---|---|---|---|
| 1) General File Extraction | 6) Directory | 17) Join Work Files | 19) Custom Feed | 30) Optional Step I.. |
| 2) Active Lot Extraction | 7) Display Work File | 18) Approximate Join | 20) DataTrieve Feed | 31) Selective Lot I.. |
| 3) History Lot Extraction | 8) Print Work File | | 21) DIF File Conversion | |
| 4) Engineering Extraction | 9) Sort Work File | | 22) Enhansys Feed | |
| 5) Linked File Extraction | 10) Merge Work File | | 23) Oracle Feed | |
| | 11) Remove Duplicate | | 24) Rdb/PROMIS Feed | |
| | 12) Delete Work File | | 25) RSI Feed | |
| | 13) Externalize Work File | | 26) SAS Feed | |
| | 14) Internalize Work File | | 27) Superscript | |
| | 15) Create Descriptor | | 29) DAN Data Analysis | |
| | 16) Edit Descriptor | | | |

FIG. 3

1 Non-Available Equipment Report
2 Current Equipment Status Report
3 Equipment Status Classification Report
4 LogSheet Real Time Report
5 Current Rework Wip Report
6 Super Hot/Hot Lot Report
7 DIF-PE Hold Lot Report
8 OOC OOS LOT Report
9 Pilot Lot Report
10 Engineer Lot Report
11 Hold Lot Report
12 Running Lot Report
13 Bank Lot Report
14 Bank IN/OUT Report
15 Hold/Release Lot Review Report
16 FAB WIP Schedule Report
17 Ad Hoc Lot Move History Report
18 Slow Moving Lot eport
19 RD Slow Moving Lot Report
20 Part Information Report
21 PM Related Report (Confirm & in Process)
22 PM Related Report (Overdue PM)
23 PM Related Report (Next 2 Day PM)
24 PM Related Report (All Schedule PM)
25 PM Related Report (All Schedule by LOC)
26 MFG Capability Move Wip Report
27 MFG Focus PARTS LIST Report

*FIG. 4*

METHOD FOR REAL TIME DATA REPLICATION

FIELD OF THE INVENTION

The present invention relates generally to data processing systems for manufacturing/fabrication and more specifically to a method of real time access to data stored in data processing systems for manufacturing/fabrication.

BACKGROUND OF THE INVENTION

Some non-relational proprietary database systems use Index Sequential Access Method (ISAM) files as the database access method. One such database system is the proprietary PROMIS (PROcess Manufacturing Integration Systems). PROMIS is a factory automation and management system available from the PROMIS System Corporation. The PROMIS system plans, monitors and controls activity in complex process manufacturing environments.

However it is very difficult to access data in ISAM database systems through SQL query tools such as Oracle™ SQL/Plus, Microsoft Visual Basic/Access™, etc. Although an SQL gateway to the proprietary system is a method to solve the problem, poor performance is a big issue in a large database. Further, engineering data is large and complex, and it is difficult to translate by an SQL gateway.

Another method is to extract the data using the data extraction functions provided by the proprietary system to an external file, such as a text file and then periodically load the text file to a relational database batch by batch for example every hour. However the user is not able to get data in real time.

U.S. Pat. No. 5,778,386 to Lin et al. describes a computer operated method comprising a sequence of steps for management of data of a manufacturing operation with workstations in several different functional locations.

U.S. Pat. No. 5,603,024 to Goldring describes a lossless distribution of time series data in a relational data base network.

U.S. Pat. No. 5,862,054 to Li describes a method to monitor process parameters from multiple process machines to provide real time statistical process control (SPC).

U.S. Pat. No. 5,806,075 to Jain et al. describes a method and apparatus for peer-to-peer data replication. The method provides the ability to replicate modifications made at a local site to multiple remote sites in a peer-to-peer environment.

SUMMARY OF THE INVENTION

Accordingly, it is an object of the present invention to provide an improved method of real time access to data stored in data processing systems for manufacturing/fabrication.

Another object of the present invention is to provide an improved method of real time access to data stored in non-relational data base systems through relational data base programs.

A further object of the present invention is to provide a data replication process from data stored in data base systems to permit real time access to that data.

Other objects will appear hereinafter.

It has now been discovered that the above and other objects of the present invention may be accomplished in the following manner. Specifically, a computer-based method of data replication of data in a programmable computer system having an ISAM database and a transaction log file, with the ISAM database having fields of tables and the transaction log file maintaining all files transactions of the ISAM database, comprises the following steps. Polling the transaction log file for file transactions of at least one selected ISAM database fields of tables by at least one data replication server. Reading the polled file transactions of the at least one selected ISAM database fields of tables by the at least one data replication server. Sending the polled file transactions of the at least one selected ISAM database fields of tables from the at least one data replication server to at least one relational database whereby the polled file transactions of the at least one selected ISAM database fields of tables sent to the at least one relational database is accessible in real time.

BRIEF DESCRIPTION OF THE DRAWINGS

The present invention will be more clearly understood from the following description taken in conjunction with the accompanying drawings in which like reference numerals designate similar or corresponding elements, regions and portions and in which:

FIG. 2 is an example of a portion of a transaction file sample.

FIG. 3 is a listing of sample data extraction functions of a proprietary system, such as a PROMIS system.

FIG. 4 is a listing of a sample list of reports from the relational database derived from an ISAM database system in accordance with a preferred embodiment of the present invention.

DETAILED DESCRIPTION OF THE PREFERRED EMBODIMENT

Unless otherwise specified, all structures, layers, steps, methods, etc. may be formed or accomplished by conventional steps or methods known in the prior art.

BRIEF SUMMARY OF THE INVENTION

The following is a brief summary of the data replication process of the present invention:
1. Get configure file, i.e. define which ISAM table is to be replicated and to which database;
2. Initialize configure variable;
   Database connect string;
   Flags to send database tables;
3. Connect to database;
4. Obtain last applied transaction log sequence number from the last update file;
5. Open the transaction log file;
6. Find the last applied record using the last applied transaction log sequence number from the transaction log file;
7. Loop 7.1 to 7.5:
   7.1 Get the next transaction log record;
   7.2 IF the transaction log record type is delete, THEN:
      7.2.1 Determine from the configure file if need to delete the record from the database table;
   7.3 IF the transaction log record type is put (insert) THEN:
      7.3.1 Determine from the configure file if need to insert the record from the database table;

7.4 IF the transaction log record type is update THEN:
   7.4.1 Determine from the configure file if need to update the record from the database table;
7.5 Write the transaction log sequence number to the last update file.

PREFERRED EMBODIMENT OF THE PRESENT INVENTION

It is noted that while the PROMIS factory automation system is generally used as an example ISAM database system in the present application, other such database systems, whether or not proprietary, may be used with the teachings of the present invention as is apparent to one skilled in the art.

Proprietary System Overview 100

Figure 1:
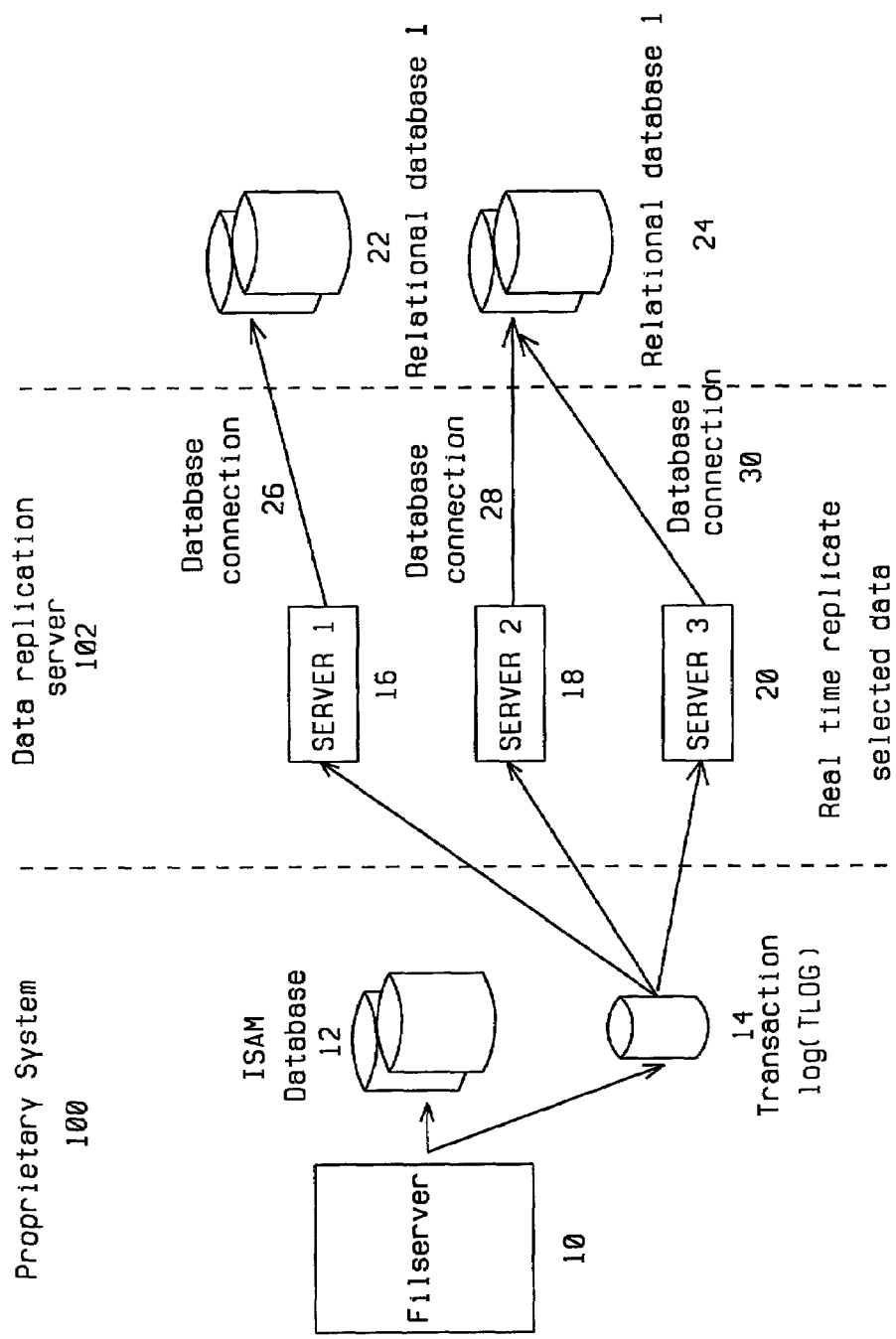
FIG. 1 schematically illustrates a preferred embodiment of the present invention.

As shown in FIG. 1, in the proprietary system 100, all updates are made through the fileserver 10 to the ISAM database 12. A transaction log file 14 is generally used by the proprietary system 100 that maintains all ISAM (Index Sequential Access Method) files transactions including insert/update/delete/before update record.

Use of Data Replication Server System 102

A further shown in FIG. 1, the inventors have discovered that the limitations of a proprietary ISAM database system 100 may be overcome by applying selected records from the ISAM system transaction log (TLOG) 14 to one or more relational databases 22, 24 in real time by the use of a data replication server system 102 including one or more data replication servers 16, 18, 20. Such relational databases 22, 24 may include an Engineer Data Analysis (EDA) relational database or a Manufacture Execution System (MES) relational database, for example.

The relational database connections 26; and 28, 30 between data replication servers 16; and 18, 20, respectively, and relational databases 1; 2, respectively, of FIG. 1. may utilized SQL NET protocol to update, for example, EDA and MES relational databases 1; 2, respectively.

Transaction Log File; FIG. 2

FIG. 2 illustrates an ISAM database system 100 transaction log 14 file sample where every transaction is logged and where, for example: "Recnum"=transaction log sequence number; "Actnum"=process ID (each one represents a user); "FUTA"=future action file; "ACTL"=active lot file; "EQPS"=equipment status; (where "FUTA," "ACTL" and "EQPS" are Index Sequential Access Method (ISAM) tables); "Beg_Mul_Upd"=begin multiple update; "End_Mul_Upd=end multiple update; "M"=multiple update; "JM"=journal flag; and "Putrec"=put (insert) record. It is noted that for a PROMIS ISAM database system, for example, a journal operation (for recovery purposes) always occurs before an update operation.

In accordance with the preferred embodiment of the present invention: fields of tables in the ISAM database 12 can be selected as needed; table in the ISAM database 12 can be selected as needed; multiple data loaders may be utilized (for example using two servers 18, 20 to update a single relational database 24); and multiple destination databases may be utilized (for example multiple servers 16, 18, 20 to update two relational databases 22, 24).

Data Extraction Functions of Proprietary System; FIG. 3

FIG. 3 illustrates 31 [labeled "1)" through "31)" for ease reference] sample data extraction functions of a proprietary system 100, for example a PROMIS system. The data extraction functions (where, for example, "Extr . . . "=extraction) may be broken down into five groups: Extraction Functions 200 (1 through 5); Work File Maintenance functions 300 (6 through 16); Join Functions 400 (17 and 18); External Interfaces 500 (19 through 29) that permit transfer from the internal format of the system 100 to formats readable by other databases, statistical software packages, etc.; and Special Reports 600 (30 and 31).

Preferably, the primary data extraction functions from the PROMIS proprietary system 100 of FIG. 3 of interest in the present invention are: the 1) General File Extraction function; and the 2) Active Lot Extraction function within the Extraction Functions group 200. Analogous such functions would be of interest for other systems 100, i.e. those that would provide greater benefits if able to be accessed in real time.

Steps of the Present Invention

The data replication process of the present invention may be represented by the following steps:

1. Get configure file, i.e. define which ISAM table is to be replicated and to which database 22, 24; (where the ISAM tables in FIG. 2 are ACTL, EQPS and FUTA;
2. Initialize configure variable;
  Database connect string;
  Flags to send database tables;
3. Connect to database 22, 24;
4. Obtain last applied transaction log 14 sequence number from the last update file; (the last update file is a flat file that stores the last update transaction log sequence number);
5. Open the transaction log file 14;
6. Find the last applied record using the last applied transaction log sequence number from the transaction log file 14;
7. Loop 7.1 to 7.5:
  7.1 Get the next transaction log record;
  7.2 IF the transaction log record type ("Operation Etc." from FIG. 2) is delete, THEN:
    7.2.1 Determine from the configure file if need to delete the record from the database table;
  7.3 IF the transaction log record type is put (insert) THEN:
    7.3.1 Determine from the configure file if need to insert the record from the database table;
  7.4 IF the transaction log record type is update THEN:
    7.4.1 Determine from the configure file if need to update the record from the database table;
  7.5 Write the transaction log sequence number to the last update file.

Essentially, the above series of steps 1 through 7, define the real time data extraction from the transaction log (TLOG) 14 of a proprietary system 100 by one or more servers 16, 18, 20 of the data replication server 102 to one or more relational databases 22, 24 to permit real time access to the data stored in a proprietary system 100. Data replication servers 16, 18, 20 poll TLOG 14 every few seconds, for example every 3 seconds, until there is no more relevant data.

List of Available Reports From Relational Databases 22, 24; FIG. 4

FIG. 4 is a sample list of real time reports (numbered 1 through 27 for ease reference) of available from relational databases 22, 24. For example, the Non-Available Equipment Report (#1) shows equipment which are not available due to the equipment being down or are awaiting an engineer to check the equipment. Users may get the real time status report from the reporting system of the present invention.

ADVANTAGES OF THE PRESENT INVENTION

The advantages of the present invention include:

1. the non-real time data access limitation of proprietary ISAM database systems can be overcome;
2. users may access non-relational proprietary ISAM database systems, such as PROMIS, through SQL queries of a relational database;
3. end-user query tools can be used to access proprietary ISAM database systems such as Oracle SQL/Plus™, GUI (graphical user interface) query tools, most Microsoft® products such as Excel®, Access® and Visual Basis®, and Java™ applications via JDBC;
4. the proprietary system host load is reduced;
5. more than one data replication server can update the same relational database to speed up data replication; and
6. can replicate to more than one relational database.

Figure 5:
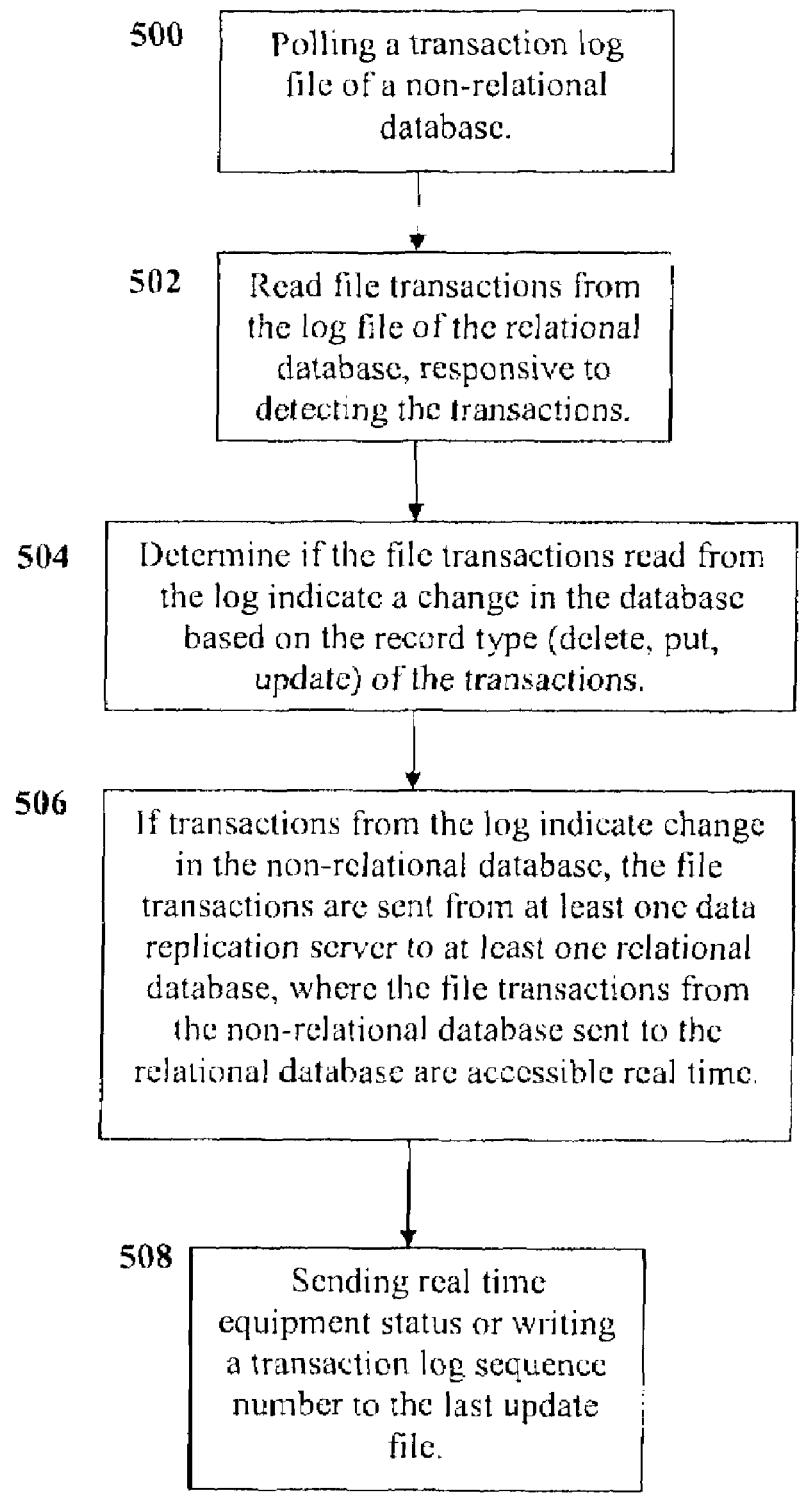
FIG. 5 illustrates a flowchart of an exemplary method of the invention.

FIG. 5 illustrates a flowchart of an exemplary date replication method of the invention. The method begins at step 500, where a transaction log file of a non-relational database is polled by a data replication server. The method continues to step 502, where responsive to detecting file transactions of the non-relational database, the method reads the file transactions from the transaction log file of the non-relational database. The method then continues to step 504, where the method determines if the file transactions read from the transaction log file indicate a change in the non-relational database based on a record type of the file transactions, wherein the record type is one of a delete, put, and update record. Thereafter, the method continues to step 506, where if the file transactions read from the transaction log file indicate a change in the non-relational database, the file transactions are sent from the at least one data replication server to at least one relational database, wherein the file transactions of the non-relational database sent to the at least one relational database are accessible in real time. The method may further include sending a real time equipment status from the at least one data replication server to the at least one relational database, and/or the method may further include writing a transaction log sequence number to the last update file, as shown in step 508.

While particular embodiments of the present invention have been illustrated and described, it is not intended to limit the invention, except as defined by the following claims.

We claim:

1. A computer-based method of data replication in a programmable computer system comprising the steps of:
    polling a transaction log file of a non-relational database of a proprietary system at a time interval for file transactions of the non-relational database by at least one data replication server not running the non-relational database;
    responsive to detecting file transactions of the non-relational database, reading the file transactions from the transaction log file of the non-relational database by the at least one data replication server;
    determining if the file transactions read from the transaction log file of the non-relational database indicate a change in the non-relational database based on a record type of the file transactions, wherein the record type is one of a delete, insert, and update record; and
    if the file transactions read from the transaction log file of the non-relational database indicate a change in the non-relational database, sending the file transactions from the at least one data replication server to at least one relational database, wherein the file transactions of the non-relational database sent to the at least one relational database are accessible in real time and wherein the at least one relational database is updated by more than one data replication server at a time.

2. The computer-based method of claim 1, wherein the file transactions sent from the at least one data replication server to the at least one relational database are sent via respective relational database connections utilizing a relational database access protocol.

3. The computer-based method of claim 1, wherein the at least one relational database being a relational database selected from the group consisting of: an Engineer Data Analysis (EDA) relational database, and a Manufacture Execution System (MES) relational database.

4. The computer-based method of claim 1, wherein the reading step comprises:
    retrieving a configure file indicating from which table of the non-relational database is data to be replicated and to which of the at least one relational database is data to be replicated;
    initializing a configure variable; and
    connecting to the at least one relational database.

5. The computer-based method of claim 4, wherein reading step further comprises:
    retrieving a last applied transaction log sequence number from a last update file;
    opening the transaction log file; and
    locating a last applied record based on the last applied transaction log sequence number.

6. The computer-based method of claim 4, wherein the determining step comprises:
    determining from the configure file if each of the file transactions is to be at least one of delete, insert, and updated in the at least one relational database.

7. The computer-based method of claim 6, wherein the determining step further comprises writing the transaction log sequence number to the last update file.

8. The computer-based method of claim 1, wherein the at least one relational database is accessible using an end user query tool.

9. The computer-based method of claim 1, wherein the at least one data replication server generates at least one real time report.

10. The computer-based method of claim 1, wherein the reading step is performed using at least one data extraction function of the proprietary system.

11. The computer-based method of claim 1, further comprising:
    sending a real time equipment status from the at least one data replication server to the at least one relational database.

12. The computer-based method of claim 1, wherein the change in the non-relational database comprises a change in a field of a table of the non-relational database.

13. A data processing computer-based system for data replication in a sub-system; the data processing computer-based system comprising:
    polling means for polling a transaction log file of a non-relational database of a proprietary system at a time interval for file transactions of the non-relational database by at least one data replication server not running the non-relational database;
    responsive to detecting file transactions of the non-relational database, reading means for reading the file transactions from the transaction log file of the non-relational database by the at least one data replication server;

determining means for determining if the file transactions read from the transaction log file of the non-relational database indicate a change in the non-relational database based on a record type of the file transactions, wherein the record type is one of a delete, insert, and update record; and if the file transactions read from the transaction log file of the non-relational database indicate a change in the non-relational database, sending means for sending the file transactions from the at least one data replication server to at least one relational database through at least one respective communication link, wherein the file transactions of the non-relational database sent to the at least one relational database are accessible in real time and wherein the at least one relational database is updated by more than one data replication server at a time.

14. The computer-based system of claim 13, wherein the at least one data replication server poll the transaction log file by at least one respective polling means; the file transactions of the non-relational database are sent from the at least one data replication server to the at least one relational database via respective relational database communication connections utilizing a relational database access protocol.

15. The computer-based system of claim 13, wherein the at least one relational database being a relational database selected from the group consisting of: an Engineer Data Analysis (EDA) relational database, and a Manufacture Execution System (MES) relational database.

16. The computer-based system of claim 13, wherein the reading means comprises:

retrieving means for retrieving a configure file indicating from which table of the non-relational database data is to be replicated and to which of the at least one relational database data is to be replicated;

initializing means for initializing a configure variable; and connecting means for connecting to the at least one relational database.

17. The computer-based system of claim 16, wherein the reading means further comprises:

retrieving means for retrieving a last applied transaction log sequence number from a last update file;

opening means for opening the transaction log file; and locating means for locating a last applied record based on the last applied transaction log sequence number.

18. The computer-based system of claim 17, wherein the determining means comprises:

retrieving means for retrieving a next transaction record;

determining means for determining if a record type of the next transaction record is one of a delete, insert, and update; and determining means for determining from the configure file if the next transaction record is to be at least one of deleted, put, and updated in the at least one relational database.

19. The computer-based system of claim 18, wherein the determining means further comprises writing means for writing the transaction log sequence number to the last update file.

20. The data processing computer-based system of claim 13, wherein the at least one relational database is accessible using an end user query tool.

21. The computer-based system of claim 13, wherein the at least one data replication server generates at least one real time report.

22. The computer-based system of claim 13, wherein the reading means is performed using at least one data extraction function of the proprietary system.

23. The computer-based system of claim 13, wherein the change in the non-relational database comprises a change in a field of a table of the non-relational database.

24. The computer-based system of claim 13, further comprising:

sending means for sending a real time equipment status from the at least one data replication server to the at least one relational database.

* * * * *